United States Patent [19]

Kirby

[11] Patent Number: 5,213,452
[45] Date of Patent: May 25, 1993

[54] ROUTER TYPE CUTTER
[75] Inventor: Mark Kirby, Sheffield, England
[73] Assignee: Technicut Limited, Sheffield, United Kingdom
[21] Appl. No.: 888,398
[22] Filed: May 21, 1992

Related U.S. Application Data

[63] Continuation of Ser. No. 550,158, Jul. 9, 1990, abandoned.

[30] Foreign Application Priority Data

Jul. 13, 1989 [GB] United Kingdom ............ 8916263

[51] Int. Cl.$^5$ ............................................. B23C 5/18
[52] U.S. Cl. ..................................... 407/42; 76/115; 407/54; 407/63; 407/118
[58] Field of Search ............... 407/36, 42, 51–54, 407/56, 58, 59, 60–63, 34, 118; 76/115

[56] References Cited

U.S. PATENT DOCUMENTS

| | | | |
|---|---|---|---|
| Re. 26,544 | 3/1969 | Castor, Sr. | 407/53 |
| 2,129,418 | 9/1938 | Case | 407/53 |
| 2,923,053 | 2/1960 | Babbitt | 407/53 |
| 3,133,339 | 5/1964 | Ribich | 407/54 |
| 3,514,828 | 6/1970 | Wale | 407/54 |
| 3,775,819 | 12/1973 | Ribich | 407/53 |
| 4,083,643 | 4/1978 | Parone | 407/59 |
| 4,212,568 | 7/1980 | Minicozzi | 407/53 |
| 4,274,771 | 6/1981 | Nishimura | 407/53 |
| 4,285,618 | 7/1981 | Shanley, Jr. | 407/59 |
| 4,300,862 | 11/1981 | Yada | 467/53 |
| 4,497,600 | 2/1985 | Kishimoto | 407/53 |
| 4,764,059 | 8/1988 | Wale | 407/42 |
| 4,946,318 | 8/1990 | David et al. | 407/42 |

FOREIGN PATENT DOCUMENTS

| | | | |
|---|---|---|---|
| 0008159 | 2/1980 | European Pat. Off. | |
| 0062693 | 10/1982 | European Pat. Off. | |
| 55067 | 5/1977 | Japan | 407/59 |
| 1279238 | 6/1972 | United Kingdom | |
| 1334676 | 10/1973 | United Kingdom | |
| 2164283 | 3/1986 | United Kingdom | 407/53 |
| 2182274 | 5/1987 | United Kingdom | |
| 2186220 | 8/1987 | United Kingdom | |

Primary Examiner—Steven C. Bishop
Attorney, Agent, or Firm—Trexler, Bushnell, Giangiorgi & Blackstone, Ltd.

[57] ABSTRACT

A router type cutter (1) has at one end thereof a drive spigot (2) adapted to be clamped in a rotatable toolholder of a machine tool, at least one helix (3) extending part-way along the cutter (1) from the other end, onto a cutting edge of which helix (3) is brazed a tungsten carbide insert (10) having a non-linear cutting profile along its end face (12).

17 Claims, 4 Drawing Sheets

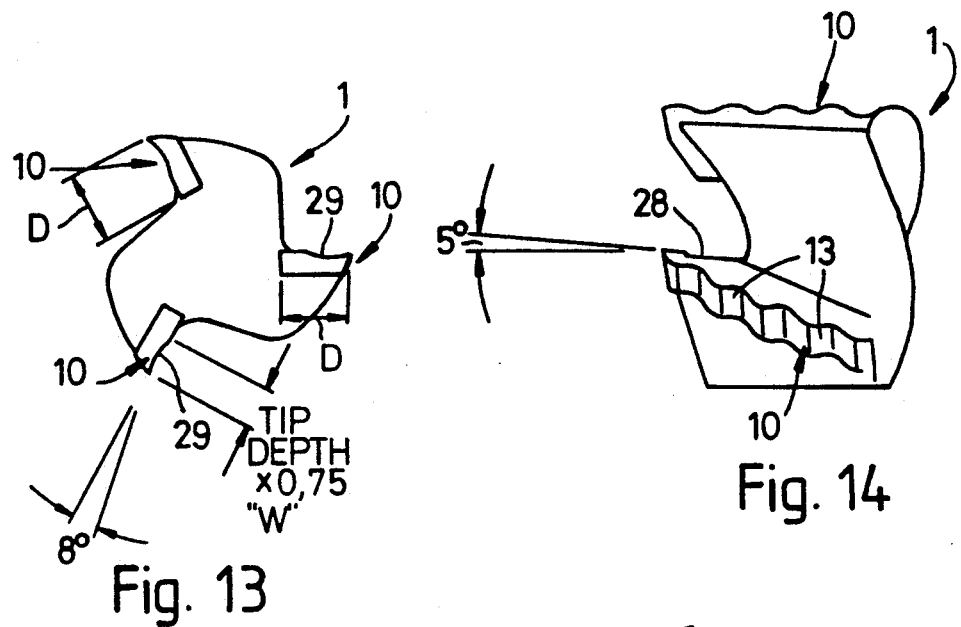
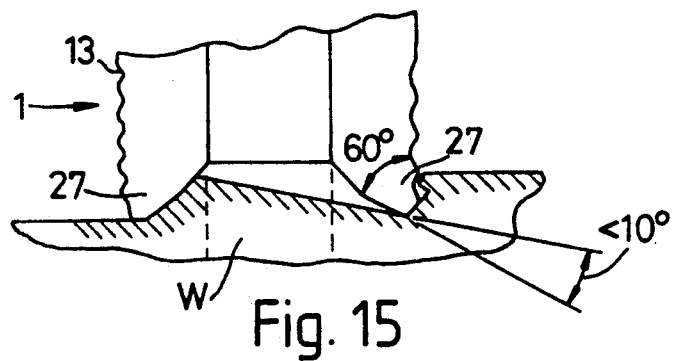
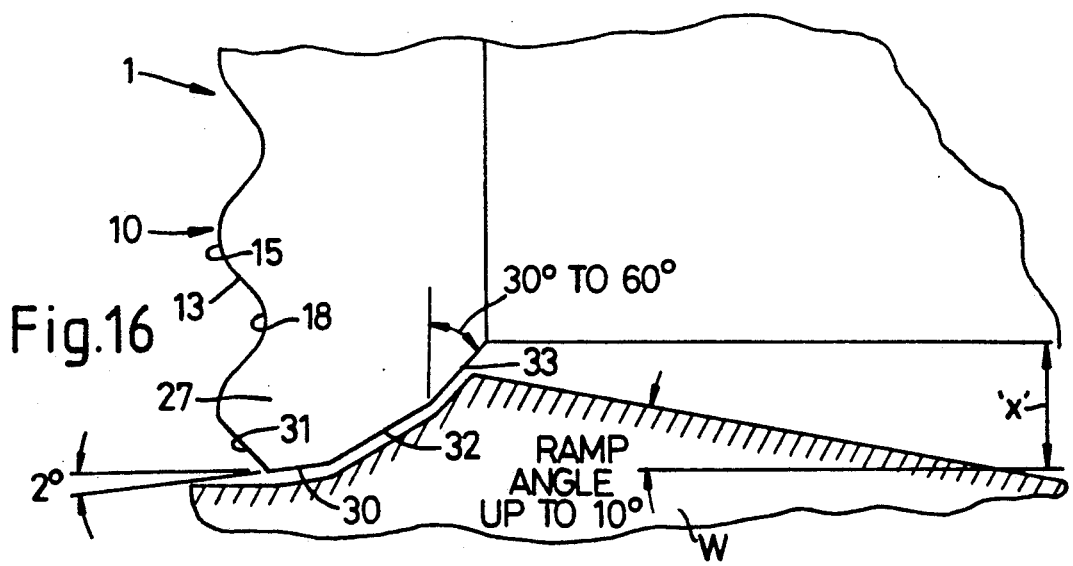

ROUTER TYPE CUTTER

This application is a continuation of application Ser. No. 07/550,158, filed Jul. 9, 1990, now abandoned.

BACKGROUND OF THE INVENTION

This invention relates to a router type cutter for the cutting of slots etc., particularly in metals, such as aluminium alloys.

One known cutter for slot machining is a twin helix cutter, with a twisted carbide insert brazed along a cutting edge of each helix, the latter being at 30°, and is used for both roughing and finishing operations. Typical capabilities are:

RPM - 9000
Feed per Tooth - Up to 0.004"/rev.
Maximum Feed Rate - 70"/min.
Cross Section of Cut - Variable Another known cutter, primarily designed for roughing, is a router cutter with a single, clamped, carbide tip of the throw-away kind, but due to the tip length, this cutter has a cut depth limitation of 25 mm. Typical capabilities are:

RPM - 9000
Feed - 0.010"/Rev.
Maximum Feed Rate - 90"/min
Cross Section of Cut - Full dia. × 15 mm.

Also known are high speed steel router cutters, but their use is limited to low productivity applications due to the relatively low surface speed and feed capabilities of high speed steel. Typical capabilities are:

RPM - 2000 to 4000 (depending on dia.)
Feed - 0.002" to 0.004"/rev.

ROUTER TYPE CUTTER

This invention relates to a router type cutter, for the cutting of slots etc., particularly in metals, such as aluminium alloys.

One known cutter for slot machining is a twin helix cutter, with a twisted carbide insert brazed along a cutting edge of each helix, the latter being at 30°, and is used for both roughing and finishing operations. Typical capabilities are:

RPM - 9000
Feed per Tooth - Up to 0.004"/rev.
Maximum Feed Rate - 70"/min.
Cross Section of Cut - Variable Another known cutter, primarily designed for roughing, is a router cutter with a single, clamped, carbide tip of the throw-away kind, but due to the tip length, this cutter has a cut depth limitation of 25 mm. Typical capabilities are:

RPM - 9000
Feed - 0.010"/Rev.
Maximum Feed Rate - 90"/min
Cross Section of Cut - Full dia. × 15 mm.

Also known are high speed steel router cutters, but their use is limited to low productivity applications due to the relatively low surface speed and feed capabilities of high speed steel. Typical capabilities are:

RPM - 2000 to 4000 (depending on dia.)
Feed 0.002" to 0.004"/rev.
Maximum Feed Rate - Up to 32"/min. (2 Flute)
Cross Section of Cut - Variable.

According to the present invention, there is provided a router type cutter having at one end thereof a drive spigot adapted to be clamped in a rotatable tool holder of a machine tool, at least one helix extending part-way along the cutter from the other end, onto a cutting edge of which helix is brazed a tungsten carbide insert having a non-linear cutting profile along its end face.

By a non-linear profile is meant an interrupted profile. Such interruption may be produced by forming alternating recesses and projections along the end face. In detail, the recesses and projections may be provided by screw thread profiles or modified screw thread profiles. In detail, the recesses or projections may be provided by teeth, notches, peaks, troughs, steps, scallops etc., in the end face of the carbide. In one embodiment a sinusoidal or generally sinusoidal profile is produced, and in another embodiment a screw thread profile is produced, both of which profiles provide a very efficient tool for the purpose of roughing out vast quantities of aluminium alloy for example. If however, the resulting relatively rough peripheral surface finish is not acceptable, which in a few instances might be the case, then the sinusoidal profile, or the screw thread profile, may be modified by forming it with a flat crest, in contrast to the radiussed crest. With a screw thread profile, the groove flanks preferably subtend an angle of 20° to 60°, with not only a radiussed root but also a radiussed corner at the junction between the flanks and the flat crest. In detail, for a pitch P, these radii may be struck from centres spaced apart by 0.3 P to 0.7 P.

One method of producing a flat crest form would be to produce the cutting end face as a normal end mill 6° primary 12° secondary and produce a series of notches (by radial infeed of diamond slotting wheel of width corresponding to the slot width required) to give the chip breaker effect. This however has draw-backs when applied to tungsten carbide, in that sharp corners are generated by conventional slotting process in which a castellated effect is produced with the slots parallel sided, which sharp corners are undesirable in tungsten carbide due to carbide weakness thus causing premature failure e.g. at the corners and possible root cracking. Hence, it is preferred for planar flanked "V"-shaped grooves for the aforementioned screw thread profile to be produced by means of a diamond form grinding wheel, the grinding circumference of which has a central, notch-forming projection, of profile corresponding to that required for the notches and, to each side of the projection, flat shoulders to grind the flat crest portions.

The form wheel is preferably infed into the carbide as the cutter is rotated in the opposite direction. This cuts the wheel form into the cutting edge of the carbide and through the cutter rotation a radial relief is generated. Thus, the grinding of the flat crest and radiussed notch can be achieved at the same time.

The cutter is preferably provided with a plurality of helices and hence a plurality of flutes. Thus, the cutter may be provided with two helices 180° apart, with three helices 120° apart, or with four helices 90° apart. The helix angles may be 15° to 40°.

Preferably however, in the direction of rotation, the teeth etc., of one insert are staggered with respect to the teeth of the (or an) other insert. In other words, it is arranged that the teeth of a trailing insert do not rotate in the same plane as the teeth of a leading insert, but on the contrary, are spaced axially along the cutter. Thus, for a three helix cutter, the pitch over would be 0.33, so that tooth pitch between the three inserts would be 1:1.33:1.67.

Comparative tests, with the same type of machine tool slotting and profiling the same material as the prior art cutters discussed above, have shown that a three helix router type cutter in accordance with the invention, with the staggered teeth discussed above, has the following performance:

Speed 9000 RPM
Feed 100 to 135 IPM
Depth of Cut 0.650
Material L97 - Aluminium Alloy This gives more than a 30% improvement in the feed rate compared with say the single clamped carbide blade cutter. Compared with other cutters presently in use, the cutter in accordance with the invention has the ability to profile machine at up to double the feed rates/metal removal rates.

Profile routing essentially entails the machining only of the external periphery of a component and as such requires the tool to be able to sink radially, i.e. the tool is fed radially with respect to the component, or vice versa. Pocket routing however requires the cutter to machine a pocket in the component by being fed simultaneously both radially and axially until the pocket depth is reached when radial feed only is effected. Consequently, this requires the cutter initially to cut into the component in an axial and radial direction simultaneously, known as "ramping". The requirement for the cutter to have a "ramping" capability entails an end tooth design with the ability to cut not only on the periphery but also on the inner internal face during machining. However, due to the inherent brittleness of tungsten carbide it is clearly essential if producing a form on the insert that the insert will be of a cross-section substantial enough to be able to withstand the forces generated during manufacture and use. The cross-section of the insert in accordance with the invention is therefore essentially of a greater depth end thickness than that of a normal, plain edged helical carbide router cutter.

To give maximum end tooth strength the advisable angle of ramp is <10°, and preferably 7°.

From the defined ramp angle and the cross-section of carbide, the end tooth geometry can now be defined, which is to achieve "x" minimum clearance between the end of the projecting carbide and the end of the cutter body and give maximum corner strength @ "y"°, with "y" being 60° or thereabouts.

This is achieved by three contiguous internal clearances starting from an external 45° chamfer to root of the form. These three clearances may consist of a first face adjacent the 45° chamfer having a 2° dish angle, a second face at 60° and a third face at 30° to 60°.

The end tooth style in accordance with this aspect of the invention enables the cutter to ramp as up to 10° onto a solid workpiece without binding or clogging.

Preferably, the helical inserts are positioned in the radial plane to give 0° radial rake on the end teeth. To provide positive end tooth cutting angles, the axial face of the end teeth are then ground across the tip radial face with a 5° axial rake. This prevents the insert being behind centre line causing a negative radial rake on the inner cutting edges potentially causing "drag" and pick up. Positive radial rake at 4° to 8° is preferably ground into the tip face approximately to a depth w of 75% along the helical carbide tip depth.

The 60° inclusive end tooth angle has been developed to give leading edge clearance during the 10° ramping cycle. This reduces cutting forces by reducing end tooth contact area.

BRIEF DESCRIPTION OF THE DRAWING

The invention will be described in greater detail, by way of examples with reference to the accompanying drawings, in which:

FIGS. 13, 14 and 15 are respectively end, side and enlarged axial sections of a cutter in accordance with the invention having a preferred end tooth profile;
and
FIG. 16 shows, to a larger scale, a preferred clearance profile.

DESCRIPTION OF THE PREFERRED EMBODIMENTS

Figure 1:
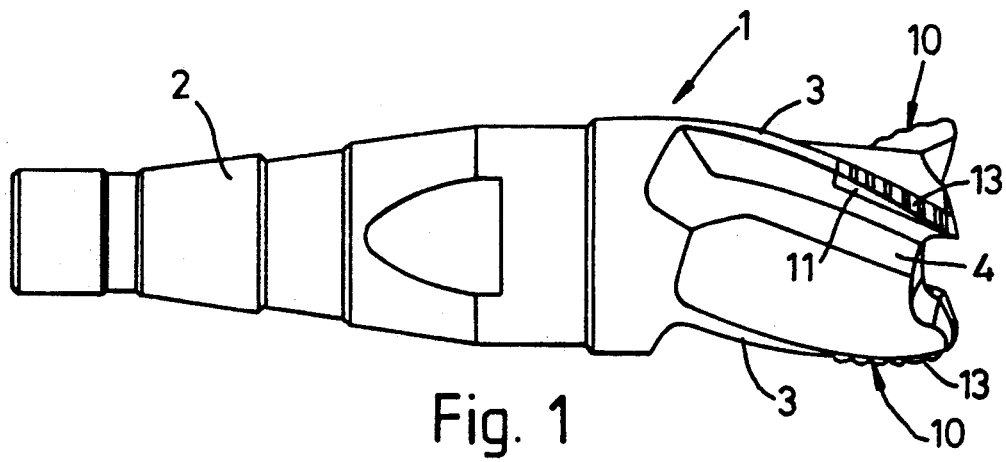
FIG. 1 is a side elevation of a router type cutter in accordance with the invention.
Figure 2:
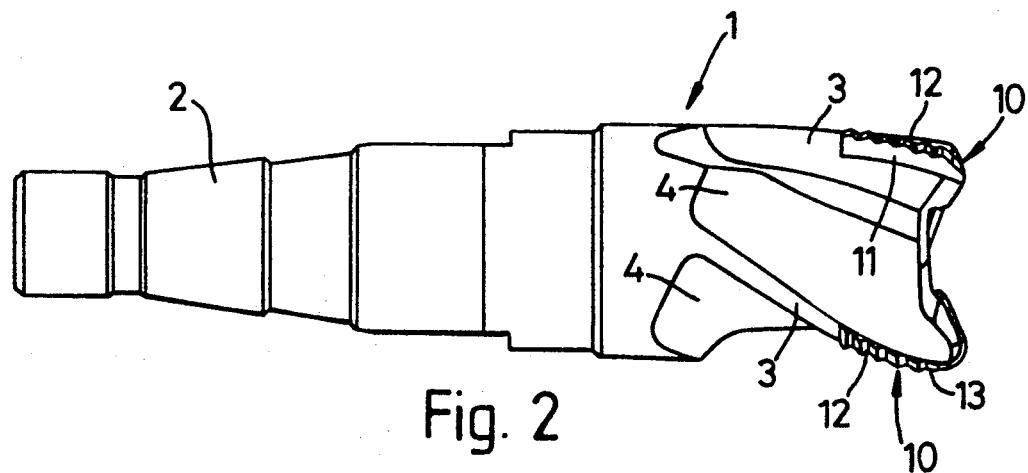
FIG. 2 corresponds to FIG. 1 but shows the cutter indexed through 90°.
Figure 3:
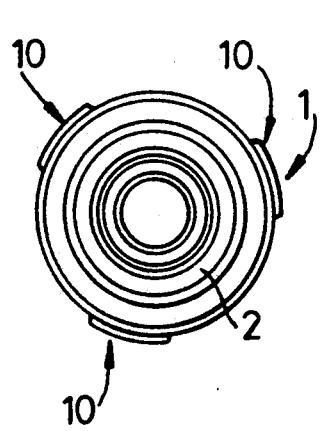
FIG. 3 is a view on one end of FIG. 1.
Figure 4:
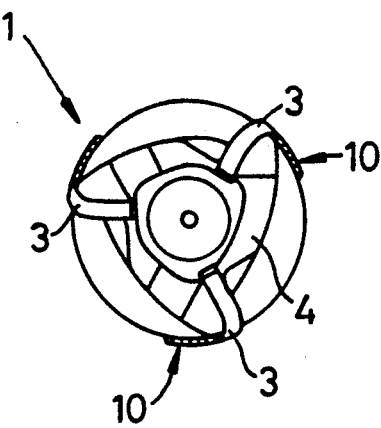
FIG. 4 is a view on the other end of FIG. 1.
Figure 5:
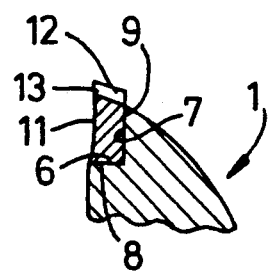
FIG. 5 is an enlarged section of a portion of FIG. 1.
Figure 6:
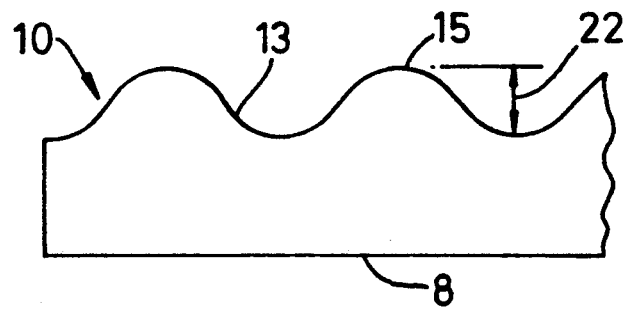
FIG. 6 is an enlarged view of a first non-linear profile of the end face of a carbide insert.
Figure 7:
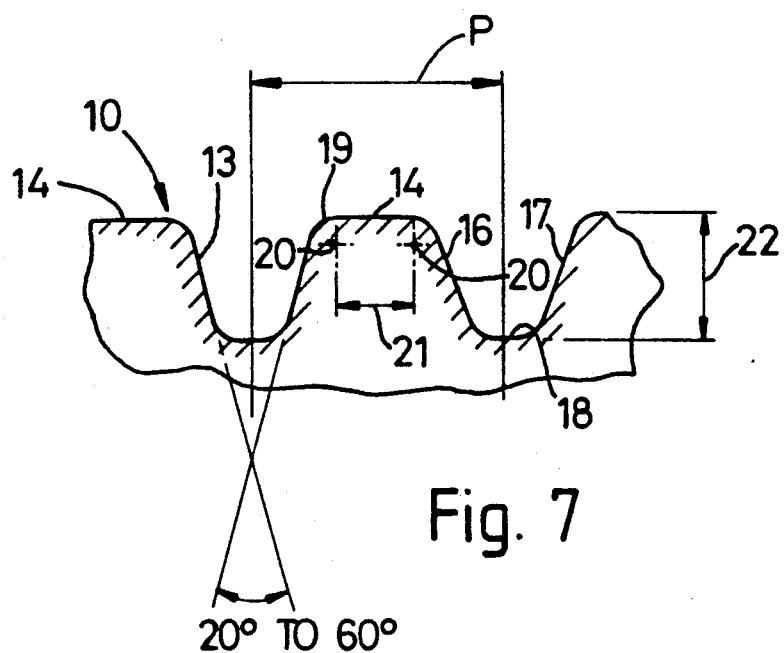
FIG. 7 corresponds to FIG. 6 but shows a second profile.

In the drawings is illustrated a router type cutter 1 having at one end thereof a drive spigot 2 adapted to be clamped in a rotatable tool holder or chuck (not shown) of a machine tool. At its other cutting end, the cutter 1 is provided with three helices 3, 120° apart and consequently with three flutes 4, 120° apart. As is clear from FIGS. 1, 2 and 5, each helix 3 is provided, part way along its length, with orthogonal base and back faces 6 and 7 respectively for the seating of correspondingly orthogonal faces 8, 9, a tungsten carbide insert 10 which is brazed in position. The insert 10 has a non-undulating radial rake face 11 and, in accordance with the invention, an radially outermost face 12 with a non-linear cutting profile. The radially outermost face 12 is in effect provided with a series of notches 13 which, as illustrated in FIG. 6, may be truely sinusoidal or, as illustrated in FIG. 7, the sinusoidal profile may be modified by providing flats 14 on the crests 15, with groove flanks 16, 17 subtending an angle of 20° to 60°, with radiussed roots indicated at 18. The flats 14 have radiussed corners 19 struck from centres 20 spaced apart by spacing 21 being 0.3 P to 0.7 P, with P being the pitch, while the form depth is indicated at 22, in both FIGS. 6 and 7.

Figure 8:
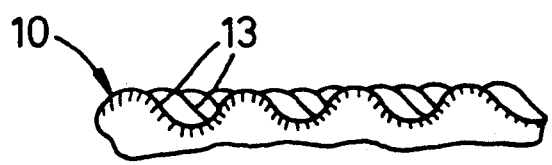
FIG. 8 indicates a plurality of carbide inserts of the FIG. 6 profile.
Figure 9:
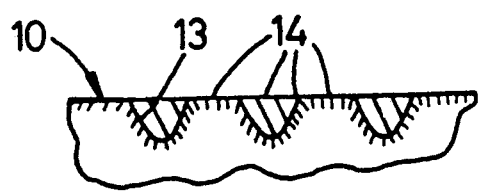
FIG. 9 corresponds to FIG. 8 but shows the FIG. 7 profile.

FIGS. 8 and 9 indicate that, for multiple fluted cutters, it is desirable for there to be progressive overlap between the crests 15, whether sinusoidal of FIG. 7 or flat crested of FIG. 8, of successive carbide inserts 10.

Figure 10:
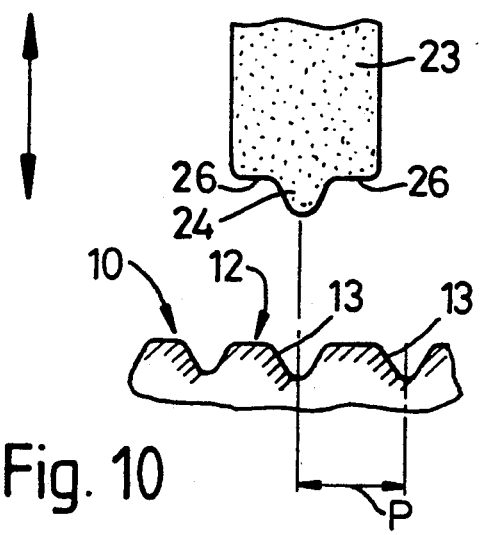
FIGS. 10 and 11 illustrate in principle the manner and equipment for producing the non-linear profile.
Figure 11:
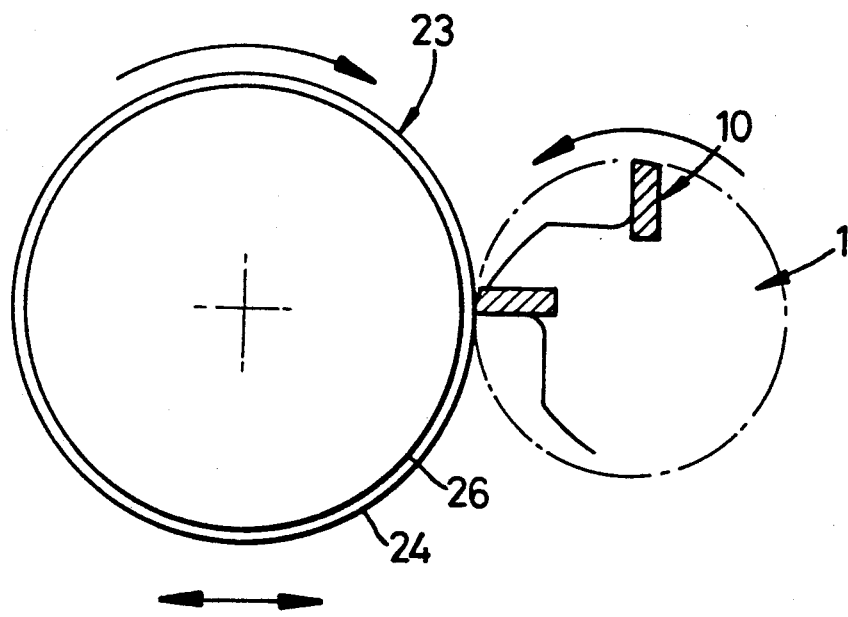
Figure 12:
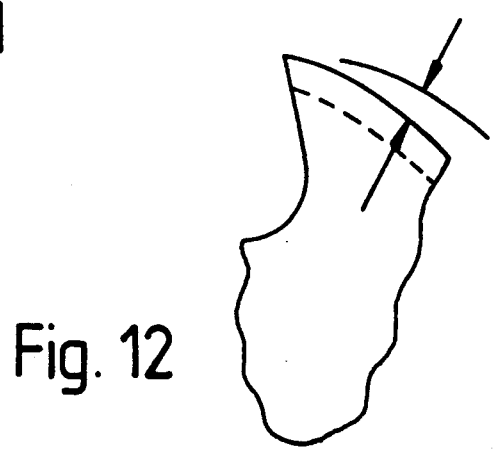
FIG. 12 indicates radial relief.

FIGS. 10-12 indicate that the radially outermost faces 12 of the carbide inserts 10 are notched at 13 after the brazing of the three inserts into position. For this purpose a diamond form wheel 23 is provided which has a circumferential notch 24 of 20° to 60° included angle to grind the notch into the carbide and, to each lateral side, a shoulder rim 26 to grind consistant accuracy to the flats 14, with, as indicated in FIG. 11, the wheel 23 and cutter 1 being rotated in opposite directions and the wheel 23 being capable of radial in-feed.

For a cutter required to have a pocket routing capability, each carbide insert 10 must be provided with an end tooth 27. As indicated on FIGS. 13-16, each end tooth 27 has a 60° included angle, to provide for satisfactory clearance which initial cutting with a 10° ramp angle, until the pocket depth required has been cut into workpiece W. As indicated in FIG. 13, the carbide inserts 10 are positioned to give 0° radial rake on the end teeth 27. The axial faces of the end teeth 27 are then ground at 28 to give a 5° positive axial rake. The radial faces are then ground at 29 to give a 4° to 8° positive radial rake over 75% of the insert depth D (0.75×w).

As can be seen from FIG. 16, each end tooth 27 has three contiguous internal clearances, being a first face 30 adjacent a 45° chamfer 31 extending to the depth of the form and having a 2° dish angle, a second face 32 at 60° and a third face 33 at 30° to 60°, which arrangement, provides "x" minimum clearance.

What I claim is:

1. A router type cutter having a longitudinal axis of rotation, a drive spigot located at one end of said cutter for clamping within a rotatable toolholder of a machine tool, a plurality of helices extending part-way along said cutter from the other end and a corresponding plurality of flutes, and a helically twisted and sintered tungsten carbide insert providing a cutting edge brazed onto each said helix and having a non-undulating, leading radial rake face, from a radially outermost edge of which insert extends a radially outermost face being generally tangential with respect to said longitudinal axis and also being generally longitudinal of said cutter, with a non-linear cutting profile, produced after brazing said insert into position by forming alternating recesses and projections by means of a diamond form grinding wheel having a grinding circumference of approximate profile, with said wheel being advanced into said carbide; and said alternating recesses and projections provided along said radially outermost face to provide said cutting edge wherein in the direction of rotation of said cutter, said alternating recesses and projections of one insert are staggered with respect to said alternating recesses and projections of another said insert.

2. A cutter as claimed in claim 1 wherein said non-linear cutting profile is sinusoidal.

3. A cutter as claimed in claim 1, wherein said non-linear cutting profile is a screw thread profile.

4. A cutter as claimed in claim 2, wherein crests of said sinusoidal profile are flat.

5. A cutter as claimed in claim 3, wherein crests of said screw thread profile are flat.

6. A cutter as claimed in claim 3, wherein groove flanks of said screw thread profile subtend an angle of 20° to 60°.

7. A cutter as claimed in claim 6, wherein roots of said flanks are radiussed.

8. A cutter as claimed in claim 5, wherein a radiussed corner is provided at junctions between said flanks and said flat crests.

9. A cutter as claimed in claim 1, provided with three helices 120° apart.

10. A cutter as claimed in claim 1, when the angle of said helix is 15° to 40°.

11. A cutter as claimed in claim 1, wherein an end tooth is provided on said insert.

12. A cutter as claimed in claim 11, wherein said end tooth is provided with three contiguous internal clearances starting from an external 45° chamfer.

13. A cutter as claimed in claim 12, wherein said three clearances consist of a first face adjacent said 45° chamfer having a 2° dish angle with respect to a plane extending orthogonally with respect to said longitudinal axis, a second face at 60° with respect to said orthogonal plane and a third face at 30° to 60° with respect to said longitudinal axis.

14. A cutter as claimed in claim 11, wherein said insert is positioned in a radial plane to give 0° radial rake on said end tooth.

15. A cutter as claimed in claim 1, wherein during advance of said wheel, said cutter is rotated in the opposite direction to that of said wheel.

16. A cutter as claimed in claim 11, wherein an axially extending face of said end tooth is then ground to give a 5° positive axial rake.

17. A cutter as claimed in of claim 11, wherein a radially extending face of said tooth is ground to provide positive radial rake at 4° to 8° approximately to a depth w being 75% of depth D of said insert.

* * * * *